(12) United States Patent
Toraichi et al.

(10) Patent No.: US 6,392,398 B1
(45) Date of Patent: May 21, 2002

(54) SAMPLING FUNCTION GENERATOR

(75) Inventors: Kazuo Toraichi, Saitama; Kouichi Wada, Ibaraki, both of (JP)

(73) Assignee: Niigata Seimitsu Co., Ltd., Niigata (JP)

( * ) Notice: Subject to any disclaimer, the term of this patent is extended or adjusted under 35 U.S.C. 154(b) by 0 days.

(21) Appl. No.: 09/623,074

(22) PCT Filed: Feb. 23, 1999

(86) PCT No.: PCT/JP99/00814

§ 371 Date: Oct. 13, 2000

§ 102(e) Date: Oct. 13, 2000

(87) PCT Pub. No.: WO99/44150

PCT Pub. Date: Sep. 2, 1999

(30) Foreign Application Priority Data

Feb. 26, 1998 (JP) ............................................. 10-62131

(51) Int. Cl.[7] ........................ G01R 23/00; G01R 27/28; H03K 3/00
(52) U.S. Cl. ..................... 324/76.21; 324/615; 327/100
(58) Field of Search ........................... 324/76.21, 76.24, 324/615, 616; 708/327, 405, 847; 375/224, 225, 226, 371; 702/66, 67, 70, 109, 124; 327/184, 361, 407, 100

(56) References Cited

U.S. PATENT DOCUMENTS 6,211,663 B1 * 4/2001 Moulthrop et al. ...... 324/76.23

FOREIGN PATENT DOCUMENTS

JP 48-44755 6/1973

OTHER PUBLICATIONS

Masaru Kamada et al, "Quadratic spline interpolator", International Journal of Systems Science, vol. 27, No. 10 (Oct. 1996) pp. 977–983.

Masaru Kamada et al, "A Smooth Signal Generator Based on Quadratic B–spline Functions" IEEE Transactions on Signal Processing, vol. 43, No. 5 (May 1995) pp. 1252–1255.

Masaru Kamada et al, "A Quadratic Spline Generator Based on B–spline Functions" Proc. ICASSP 89, vol. 2 (Feb. 1989) pp. 1243–1246.

* cited by examiner

*Primary Examiner*—Safet Metjahic
*Assistant Examiner*—J Kerveros
(74) *Attorney, Agent, or Firm*—Dellett and Walters

(57) ABSTRACT

A sampling function generator capable of providing continuous output corresponding to a sampling function. The sampling function generator 1 comprises a B spline function generation circuit 10, delay circuits 12 and 14, inverting amplifiers 16 and 18, and adding circuits 20 and 22. The B-spline function generation circuit 10 continuously produces signal waveforms according to a third order B spline function. After delayed by predetermined time or attenuated to 1/4 amplitude and inverted, the signal waveforms are combined in the adding circuits 20 and 22 to form a signal waveforms of a sampling function that is differentiable once over the range and has values of local support.

12 Claims, 10 Drawing Sheets

FIG. 10
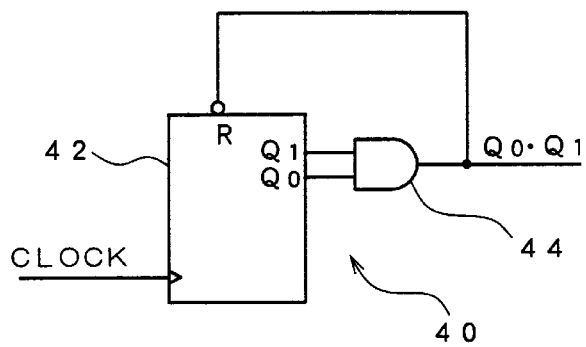
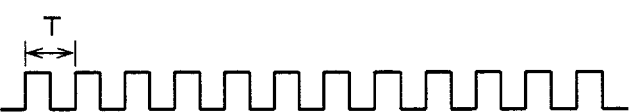
FIG. 11A  CLOCK
FIG. 11B  Q0   0V
FIG. 11C  Q1   0V
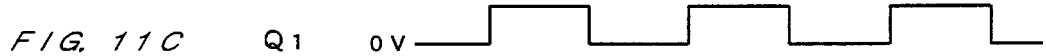
FIG. 11D  Q0·Q1  0V
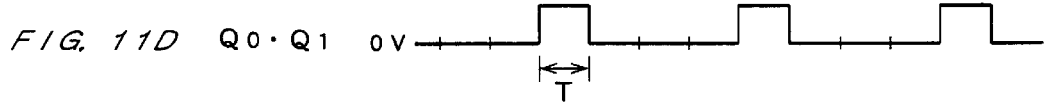

SAMPLING FUNCTION GENERATOR

BACKGROUND OF THE INVENTION

1. Field of the Invention

The present invention relates to a sampling function generator for generating a value of a sampling function used in an interpolating process. In this specification, it is assumed that a case where function values have finite values except zero in a local region and become zero in regions different from the region is called a "local support."

2. Description of the Prior Art

Conventionally, a method of interpolating data using a sampling function has been well-known as a data interpolating method for obtaining a value between preliminarily given sampling values.

FIG. 14 is an explanatory graph of a sampling function called a sinc function conventionally known. This sinc function is obtained when a Dirac delta function is inverse-Fourier-transformed, and is defined as sin (πft)/(πft) where the sampling frequency is f. This sinc function becomes one only at a sample point, where t=0, and zero at all other sample points.

FIG. 15 is an explanatory graph of data interpolation by using the sampling function shown in FIG. 14. As shown in FIG. 15, values except each sample point are interpolated by using all the sample values.

In recent digital audio devices, for example, a CD (compact disk) player, etc., the oversampling technology of enhancing the pseudo sampling frequency by interpolating discrete voice data when obtaining continuous analog voice signals from the discrete voice data. To improve the quality of voice in the oversampling technology, it is desirable that interpolation values are continuously set at shorter intervals. However, since there have been no circuits or devices for continuously generating sampling function values, the interpolation values obtained in a convolution operation using a sampling function are also discrete values. When such an interpolation value operation is performed in various digital signal processors (DSP), a value of the above mentioned sampling function has to be computed at a high speed, thereby limiting the process performance. Furthermore, there is a method for performing an interpolating operation on discrete voice data using a digital filter for which the waveform data of the above mentioned sampling function is set as a tap coefficient. However, if the interpolating interval is increased, then the number of tap coefficients becomes larger, thereby enlarging a circuit size.

Thus, to obtain an interpolation value at intervals nearly continuously, there are some problems in process performance and circuit scale. However, if the entire sampling function can be continuously generated, no such problems occur. As a result, a method of continuously generating sampling functions has been strongly demanded.

SUMMARY OF THE INVENTION

The present invention has been developed based on the above mentioned problems, and aims at providing a sampling function generator capable of obtaining a continuous output values corresponding to a sampling function.

In the sampling function generator according to the present invention, it is desirable that a B spline function generation unit generates a basic wave form corresponding to a B spline function, and a generation unit generates a signal waveform by adding before or after the basic waveform on time axis an ancillary waveform obtained by attenuating and polarity-inverting the basic waveform. With the above operation, an output value corresponding to a predetermined sampling function can be continuously obtained.

Especially, it is preferable to use a third order B spline function as the above mentioned B spline function, and as the sampling function, it is preferable to use a function, which can be differentiated only once over the whole range. It is considered that it is necessary that various signals existing in the natural world have differentiability because the signals change smoothly. Nevertheless, it is considered that it is not necessary that the differentiability is not always infinite, and that it is possible to sufficiently approximate natural phenomena so long as the signals can be differentiated only once. Although there are many advantages such as smoothly interpolating sampling values, reducing the number of sampling values to be used in an interpolating process, etc., by using a sampling function of the local support that can be differentiated finite times, conventionally, it was considered that a sampling function fulfilling these conditions did not exist. Nevertheless, by the present inventor's research, a function fulfilling the conditions described above is found.

The sampling function H(t) is defined by $-F(t+1/2)/4 + F(t) - F(t-1/2)/4$ where the third order B spline function is F(t). That is, by the definition equation, using a signal waveform of a third order B spline function, each signal waveform is generated after attenuating, polarity-inverting, and shifting on a time axis the signal waveform (actually a delay because forwarding on a time axis is not possible), thereby obtaining a signal waveform corresponding to the above mentioned sampling function H(t).

To generate the above mentioned signal waveform of a sampling function, the above mentioned generation unit includes a first inverse amplifying unit for attenuating and polarity-inverting the basic waveform output from a B spline function generation unit, and outputting a first signal waveform; a first delay unit for delaying the basic waveform by a predetermined time and outputting a second signal waveform; and a second inverse amplifying unit and a second delay unit for attenuating, polarity-inverting, and delaying by a predetermined time the basic waveform, and outputting a third signal waveform. It is preferable that the first, second and third signal waveforms are added up in an analog algorithm by a first addition unit to generate a signal waveform. Especially, assuming that the generation time of a B spline function output from the B spline function generation unit is set as 3T, it is preferable that the delay times of the first and second delay units are set as T/2 and T respectively, and the amount of attenuation by the first and second inverse amplifying units is 1/4. By generating each output obtained by these inverse amplifying units and delay units, a signal processing operation can be performed by the definition equation of the above mentioned sampling function H(t), and a sampling function can be continuously generated based on the signal waveform of the third order B spline function.

Since a third order B spline function is used as the above mentioned sampling function H(t), a differentiating process can be performed only once, and the function is a function of a local support whose value converges to 0 at t=±2, thereby satisfying the above mentioned two conditions. Using the function H(t), discrete data can be smoothly interpolated with a smaller amount of computation, thereby performing a high-precision interpolating process.

In addition, the B spline function generation unit includes a convolution operation unit for performing a convolution operation on i-order B spline function waveforms. By inputting to the convolution operation unit a triangular wave which is a signal waveform of the second order B spline function, the signal waveform of a third order B spline function can be easily generated and output.

The B spline function generation unit includes two cascade connected convolution operation units for performing a convolution operation on i-order B spline function waveforms. By inputting a rectangular wave which is the signal waveform of a first order B spline function to the convolution operation unit at the first stage, the signal waveform of the third order B spline function can be easily generated and output.

The B spline function generation unit includes three cascade connected convolution operation units for performing a convolution operation on i-order B spline function waveforms. By inputting a pulse string to the convolution operation unit at the first stage, the signal waveform of the third order B spline function can be easily generated and output.

Practically, it is preferable that the convolution operation unit includes a third delay unit and a third inverse amplifying unit for delaying by a predetermined time and polarity-inverting an input signal waveform, a second addition unit for adding up the delayed and polarity-inverted signal waveform and the input signal waveform in an analog algorithm to generate a signal waveform, and an integration unit for time-integrating the generated signal waveform. By performing the process by each unit, the convolution operation can be performed on i-order B spline function signal waveforms, and the signal waveform of the third order B spline function can be continuously output on a time axis from the integration unit contained in the convolution operation unit at the last stage.

BRIEF DESCRIPTION OF THE DRAWINGS

FIG. 10 is a diagram showing a configuration of a rectangular wave generation circuit;

FIGS. 11A to 11D are graphs showing signal waveforms of each unit of the rectangular wave generation circuit;

DESCRIPTION OF THE PREFERRED EMBODIMENTS

The feature of the sampling function generator according to an embodiment of the present invention resides in continuously generating an analog signal waveform corresponding to a sampling function, not in discretely generating a value of a sampling function in a digital process. The sampling function generator according to an embodiment of the present invention will be described below in detail by referring to the attached drawings.

Figure 1:
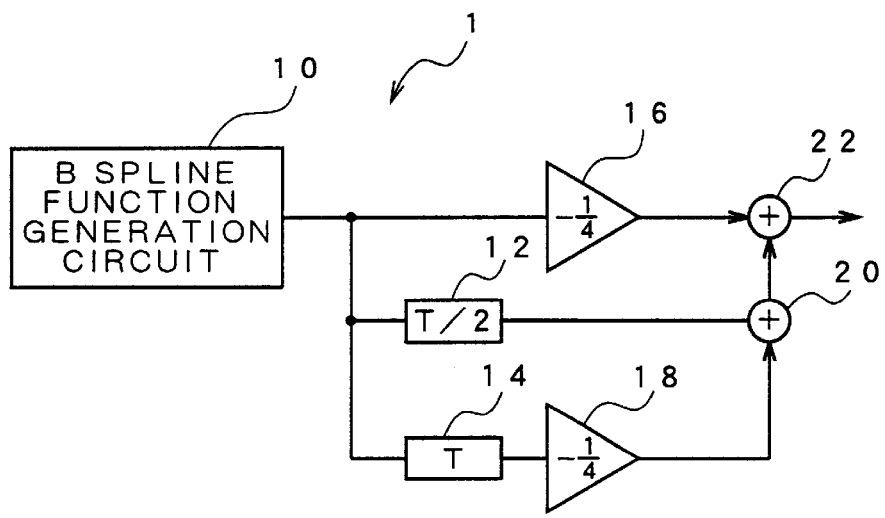
FIG. 1 is a diagram showing the configuration of the sampling function generator according to the present embodiment.

FIG. 1 shows the configuration of the sampling function generator according to an embodiment of the present invention. A sampling function generator 1 shown in FIG. 1 comprises a B spline function generation circuit 10, delay circuits 12 and 14, inverting amplifiers 16 and 18, and adding circuits 20 and 22. The configuration excluding the B spline function generation circuit 10 corresponds to the generation unit.

The B spline function generation circuit 10 generates a signal waveform corresponding to the third order B spline function. The delay circuit 12 delays by a predetermined time (T/2) and outputs a signal waveform output from the B spline function generation circuit 10. Another delay circuit 14 delays by a predetermined time (T) and outputs the signal waveform output from the B spline function generation circuit 10. The inverting amplifiers 16 and 18 attenuate the level of an input signal down to 1/4, and polarity-invert and output the resultant signal. To one inverting amplifier 16, the signal waveform output from the B spline function generation circuit 10 is directly input. To another inverting amplifier 18, a signal obtained by passing a signal waveform output from the B spline function generation circuit 10 through the delay circuit 14 is input. The two adding circuits 20 and 22 add up the three signal waveforms respectively output from the delay circuit 12, and the two inverting amplifiers 16 and 18 in an analog algorithm. The adding circuit 20 adds up the output signal from the delay circuit 12 and the inverting amplifier 18, then this additional result and the output signal from the inverting amplifier 16 are added by another adding circuit 22.

The sampling function generator 1 according to an embodiment of the present invention has the above mentioned configuration. Before explaining the operation, the outline of the sampling function generated by the sampling function generator 1 according to the present embodiment, and the data interpolating process performed using the sampling function will be described below.

Figure 2:
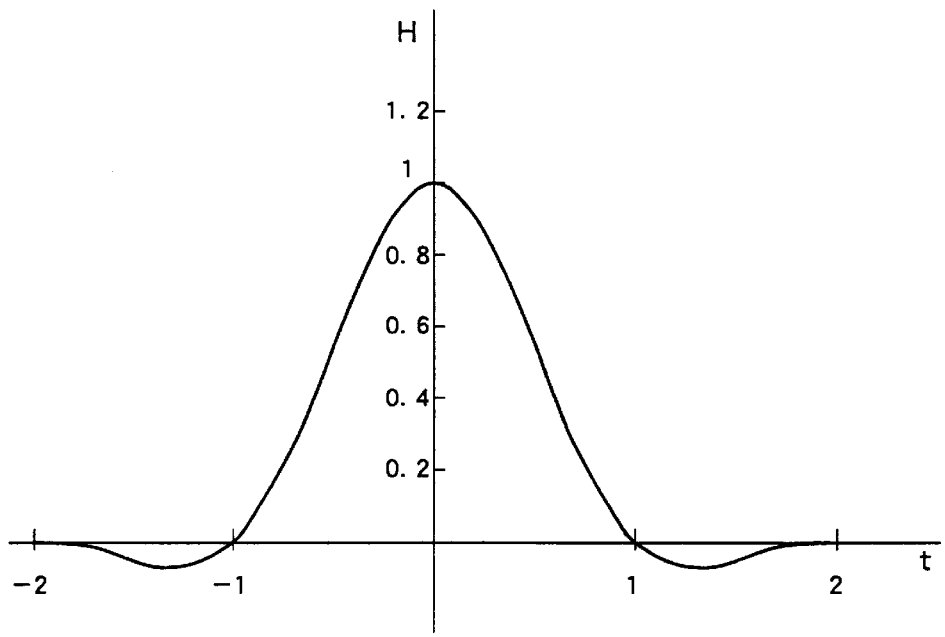
FIG. 2 is an explanatory graph of the sampling function applied in the present embodiment.

FIG. 2 is the explanatory graph of the sampling function applied in the present embodiment. A sampling function H(t) shown in FIG. 2 is a function of a local support to which attention is paid on differentiability. For example, the function H(t) can be differentiated only once in the whole region and a function of a local support having finite values, which are not zeroes, when a sample position along a horizontal axis is between −2 and +2. In addition, since being a sampling function, the function H(t) is characterized in that the function H(t) becomes one only at a sample point with t=0 and becomes zero at sample points with t=±1 and ±2.

In case where the sampling function generated by the sampling function generator 1 applying this embodiment, as shown in FIG. 2, the sample point t on the horizontal axis and the value of the sampling function H on the vertical axis are corresponding to the time passage and the signal level of the output signal respectively. Detailed explanation of the generating operation of the signal waveform corresponding to the sampling function generated by the sampling function generator 1 will be described later.

It is verified by the present inventor's investigation that a function H(t) fulfilling various conditions described above (a sampling function, one-time differentiability, and a local support) exists. Concretely, with letting a third order B spline function be F(t), such a sampling function H(t) can be defined as:

$$H(t)=-F(t+1/2)/4+F(t)-F(t-1/2)/4 \quad (1)$$

where the third order B spline function F(t) can be represented by the following equation.

$$\begin{aligned} (4t^2+12t+9)/4; & \quad -3/2 \le t < -1/2 \\ -2t^2+3/2; & \quad -1/2 \le t < 1/2 \\ (4t^2-12t+9)/4; & \quad 1/2 \le t < 3/2 \end{aligned} \quad (2)$$

The sampling function generator 1 according to the present embodiment produces a signal waveform corresponding to the sampling function H(t) by generating the signal waveforms of each term on the right side of the equation (1) produced individually by the sampling function generator 1.

The above-described sampling function H(t) is a quadric piecewise polynomial, and uses the third order B spline function F(t). Therefore, the function H(t) is a function of a local support that is guaranteed to be differentiable only once over the whole region. In addition, the function H(t) becomes zero at t=±1 and ±2.

In this manner, the above-described function H(t) is a sampling function and a function of a local support that can be differentiated only once over the whole region and converges to zero at t=±2. Therefore, it is possible to perform interpolation of a value between discrete data using a function, which is differentiable only once, by performing convolution on the basis of respective data using this sampling function H(t).

Figure 3:
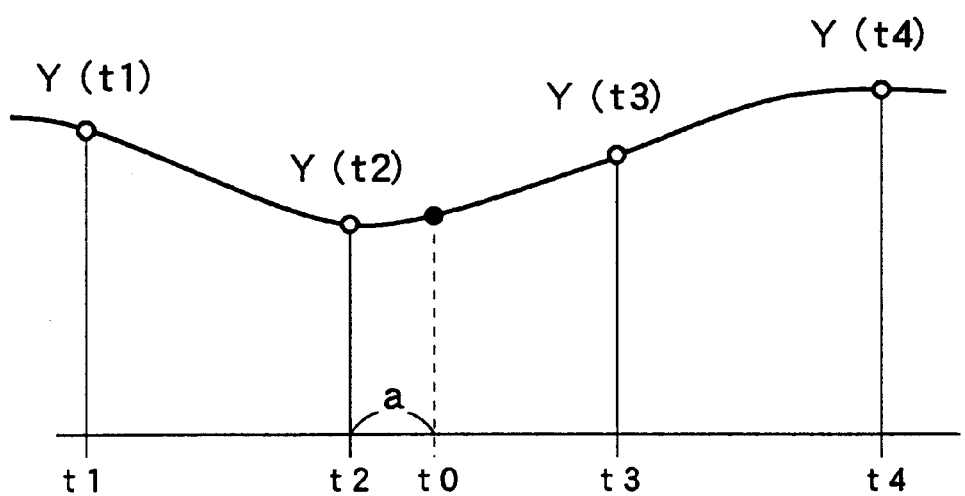
FIG. 3 is a graph showing the relationship between discrete data and interpolation values between the discrete data.

FIG. 3 shows the relationship between discrete data and interpolation values between the discrete data. For example, discrete voice data can be obtained as sampling data by sampling a smoothly changing voice signal at constant time intervals, and quantizing the sampled signal. A D/A (digital-analog) converter used in a digital audio device stores such discrete voice data, and outputs continuous analog voice signals obtained by supplementing the data in an interpolating process.

In FIG. 3, assuming that the values of the discrete data at the sample positions t1, t2, t3, and t4 at equal intervals are Y(t1), Y(t2), Y(t3), and Y(t4), the interpolation value y corresponding to a predetermined position to (distance a from t2) between the coordinates t2 and t3 is obtained as follows.

Generally, to obtain an interpolation value y using a sampling function, the value of a sampling function is obtained for each piece of the given discrete data at the position of the interpolation value y, and a convolution operation is performed using the obtained value. Since the sinc function converges to 0 at the sample point t=±∞, the interpolation value y can be correctly obtained only by computing the value of the sinc function at the position of the interpolation value y corresponding to each piece of discrete data up to t=+∞, and then performing the convolution operation using the computation result.

However, since the sampling function H(t) used in the present embodiment converges to 0 at the sampling point t=±2, the discrete data up to t=±2 should be taken into account. Therefore, when the interpolation value y shown in FIG. 3 is to be computed, only the values Y(t1), Y(t2), Y(t3), and Y(t4) of the four pieces of discrete data corresponding to t=t1, t2, t3, and t4 are to be taken into account, thereby considerably reducing the amount of processing. Additionally, there are no truncation errors occurring for each piece of discrete data where t≧±3 because there is logically no need of considering the data, not because the data is ignored in consideration of the amount of processing and necessary precision.

FIGS. 4A to 4D show in detail the data interpolation performed using a sampling function according to the present embodiment. The procedure of the interpolating process is, for each sampling position as shown in FIGS. 4A to 4D, to set equal the peak values at t=0 (center position) of the sampling functions H(t) shown in FIG. 2, where the values of the sampling functions H(t) at respective interpolation positions to are obtained.

Figure 4A:
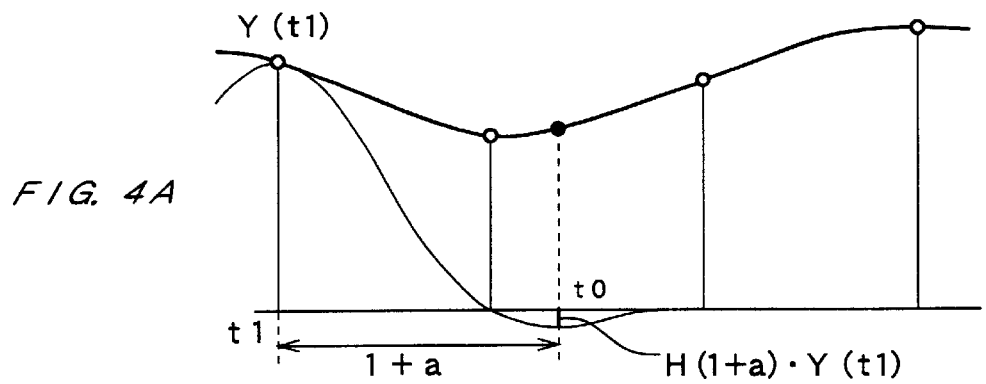
FIGS. 4A to 4D are explanatory graphs showing the data interpolation using a sampling function according to the present embodiment.
Figure 4B:
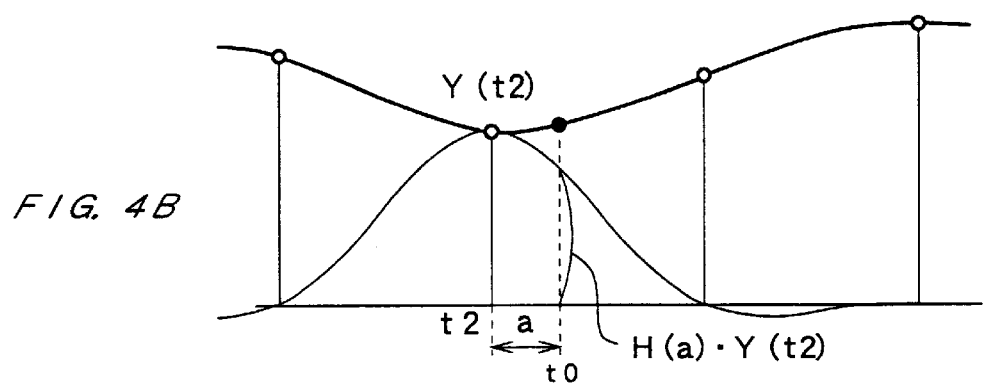
Figure 4C:
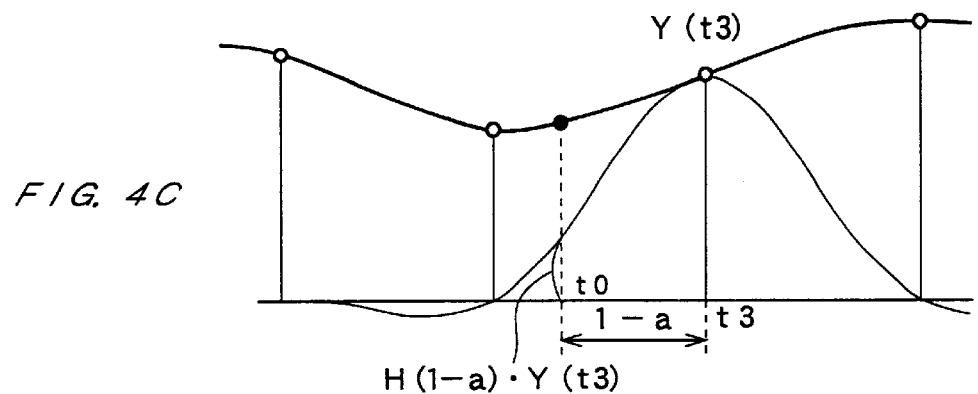
Figure 4D:
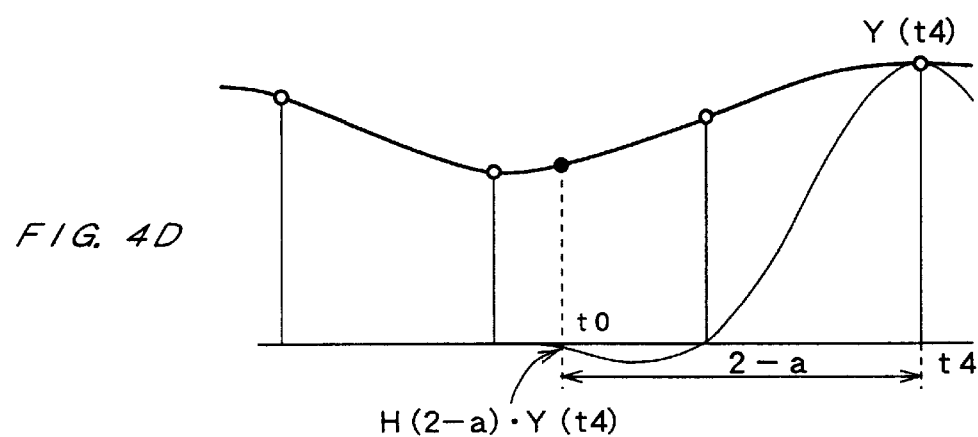

For example, the value Y(t1) of the discrete data at t1 shown in FIG. 4A will be concretely described below. The distance between the interpolation position t0 and the sampling position t1 is 1+a by normalizing the distance between the sampling positions and setting it to 1. Therefore, the value of the sampling function at the interpolation position t0 is H(1+a) when the center position of the sampling function H(t) is aligned with the sample position t1. Actually, since the peak value at the center position of the sampling function H(t) is set so as to coincide with the value Y(t1) of the discrete data, a value to be obtained is the value H(1+a)·Y(t1) computed by multiplying the above mentioned H(1+a) by Y(t1).

The sampling function generator 1 according to the present embodiment continuously generates the waveform of the sampling function H(t) shown in FIG. 2. Therefore, based on the generation start position of a signal (the position of t=−2 in FIG. 2), the output level at the time (3+a) after the starting time matches the value H(1+a) of the sampling function at t=1+a. When a value obtained by multiplying the H(1+a) by Y(t1) is computed, the output of the sampling function generator 1 is amplified by the amplifier having the gain Y(t1).

Similarly, the sampling function generator 1 generates the signal waveform of the three sampling functions whose generation starting time is sequentially delayed in unit time. Each signal is amplified by each of the amplifiers having the gains of Y(t2), Y(t3), and Y(t4), thereby obtaining the values H(a)·Y(t2), H(1−a)·Y(t3), H(2−a)·Y(t4) corresponding to the interpolation position t0 shown in FIGS. 4B to 4D at the same timing.

Thus, the four values H(1+a)·Y(t1), H(a)·Y(t2), H(1−a)·Y(t3), H(2−a)·Y(t4) obtained correspondingly to the signal level at a timing are added by an analog adder, and the interpolation value y (t0) can be obtained.

In addition, although the interpolation position t0 is shifted with time, the level of the signal waveform output from the sampling function generator 1 also changes with time. Therefore, the interpolation value y (t0) also changes continuously, and continuous interpolation signals smoothly connecting discrete data can be obtained. Especially, since continuous interpolation values can be obtained by amplifying at a predetermined gain corresponding to discrete data the signal waveforms of the four sampling functions generated at different starting timings, and adding the signal waveforms, the conventional sample holding circuit or low-pass filter are not required. Therefore, the problems of a large-scale circuit, a deteriorated group delay characteristic, etc. can be avoided. In addition, there is no need of performing a high-speed signal process as in the oversampling process, thereby requiring no expensive parts.

Described below will be the operation of generating a signal waveform by the above mentioned sampling function generator 1.

Figure 5A:
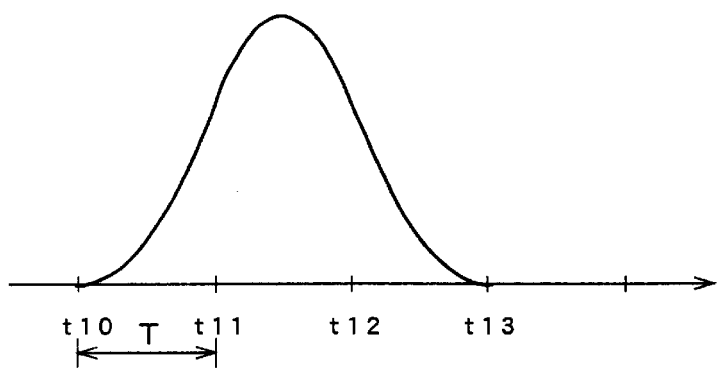
FIGS. 5A to 5E are graphs showing signal waveforms of each unit of the sampling function generator.

FIGS. 5A to 5E show signal waveforms input to or output from each unit of the sampling function generator 1. FIG. 5A shows the signal waveform (basic waveform) output from the B spline function generation circuit 10, and corresponds to the waveform of the third order B spline function expressed by the piecewise polynomial of the equation (2). The output signal is a waveform of local support having a predetermined value until the time t13 after the time lapse of 3T where T indicates the input time interval of discrete data, t10 indicates the signal generation time (generation timing).

Figure 5B:
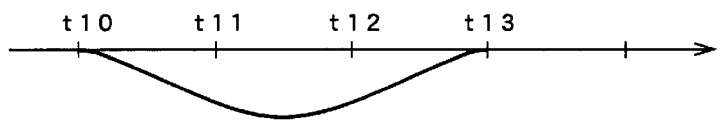

FIG. 5B shows the signal waveform (first signal waveform) output from the inverting amplifier 16, and shows the ancillary waveform obtained by polarity-inverting and attenuating to 1/4 the basic waveform output from the B spline function generation circuit 10 by passing it through the inverting amplifier 16.

Figure 5C:
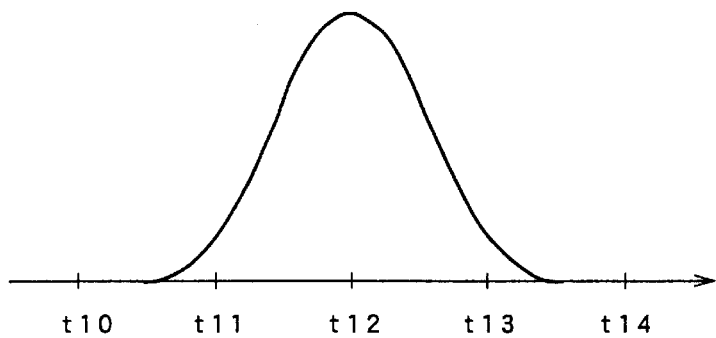

FIG. 5C shows the signal waveform (second signal waveform) output from the delay circuit 12, and shows the signal waveform obtained by delaying the basic waveform output from the B spline function generation circuit 10 by a half (T/2) of the input time interval T of discrete data by passing it through the delay circuit 12.

Figure 5D:
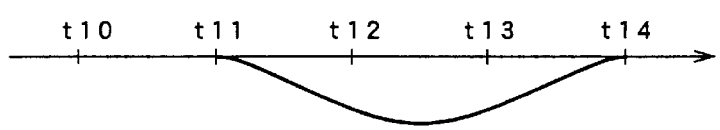

FIG. 5D shows the signal waveform (third signal waveform) output from the inverting amplifier 18, and shows the ancillary waveform obtained by polarity-inverting and attenuating the signal level to 1/4 after delaying the signal by a time length equal to the input time interval T of discrete data by passing the basic waveform output from the B spline function generation circuit 10 through the delay circuit 14 and the inverting amplifier 18.

Figure 5E:
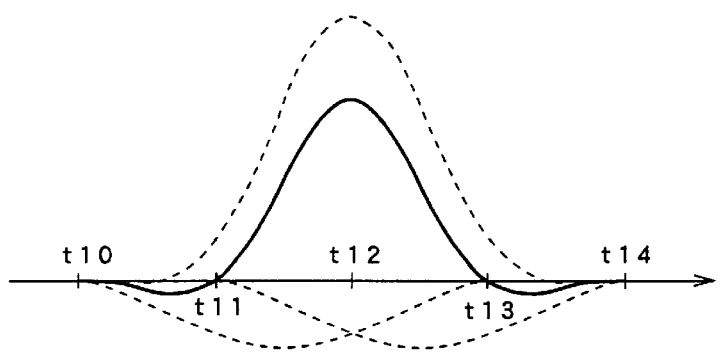

Thus, by generating a signal by adding up the signal waveforms (signal waveforms shown in FIGS. 5B, 5C, and 5D) output from the two inverting amplifiers 16 and 18, and the delay circuit 12 by the adding circuits 20 and 22 in an analog algorithm, the signal waveform shown in FIG. 5E can be obtained. The signal waveform is the same as the signal waveform shown in FIG. 2, and the sampling function, where the signal level continuously changes with time within the time t10 to t14, according to the present embodiment can be generated.

Figure 6:
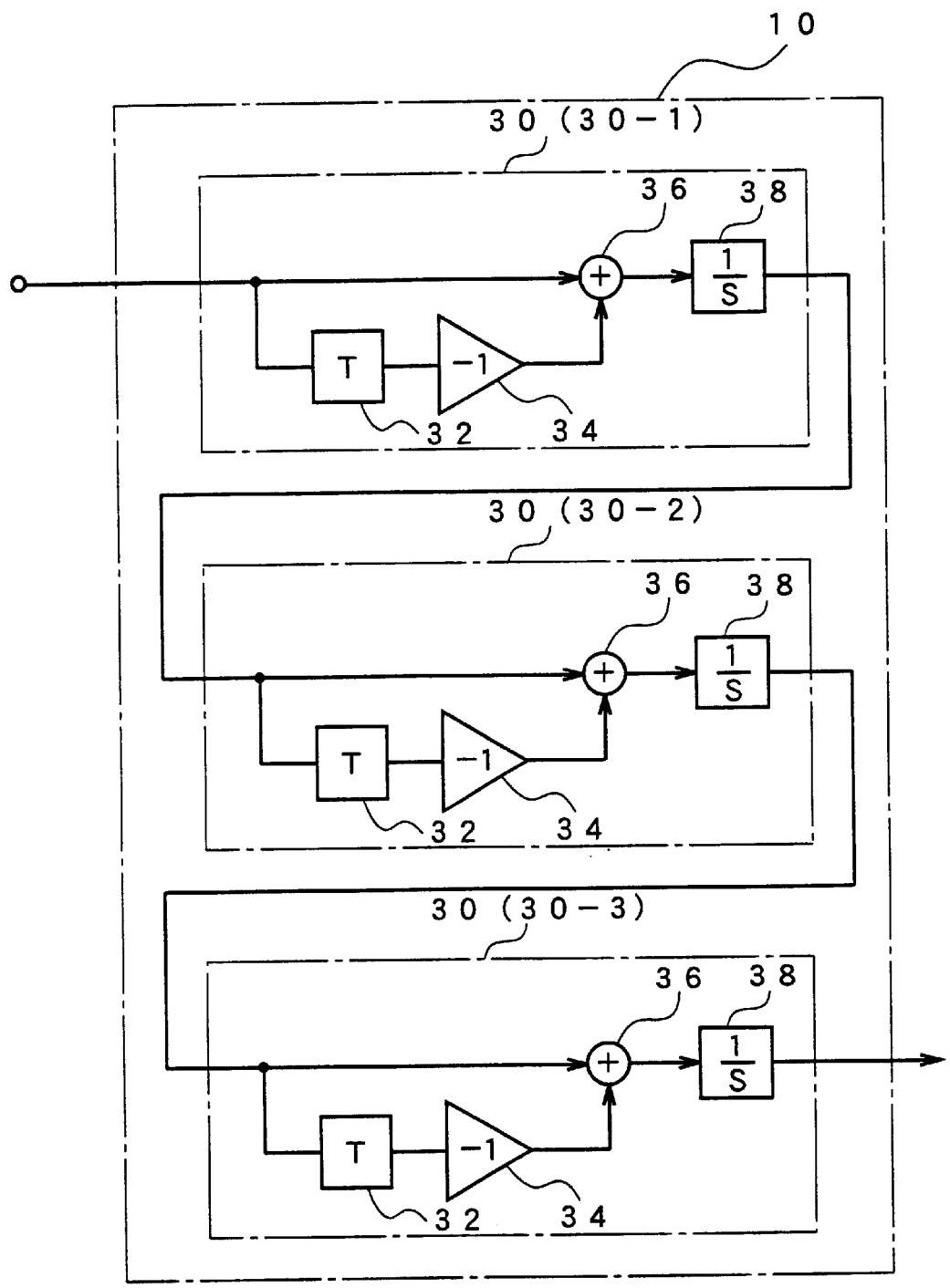
FIG. 6 is a diagram showing a practical configuration of a B spline function generation circuit.

FIG. 6 shows the practical configuration of the B spline function generation circuit 10 contained in the sampling function generator 1 according to the present embodiment. The B spline function generation circuit 10 shown in FIG. 6 comprises three cascade connected convolution operation circuits 30 (30-1, 30-2, and 30-3) having the same configurations.

Each of the convolution operation circuits 30 generates and outputs a signal waveform corresponding to the (i+1)-order B spline function by performing a convolution operation on i-order B spline functions when the signal waveform of the i-order B spline function is input.

The convolution operation circuit 30-1 at the first stage receives a pulse string having the period of 4T, and generates and outputs a rectangular wave, that is, the first order B spline function. The convolution operation circuit 30-2 at the second stage receives a signal waveform (rectangular wave) corresponding to the first order B spline function output from the convolution operation circuit 30-1 at the first stage, and generates and outputs a triangular wave, that is, the second order B spline function. The convolution operation circuit 30-3 at the third stage receives a signal waveform (triangular wave) corresponding to the second order B spline function output from the convolution operation circuit 30-2 at the second stage, and outputs a signal waveform shown in FIG. 5A, that is, the third order B spline function.

Each of the convolution operation circuits 30 comprises a delay circuit 32, an inverting amplifier 34, an adding circuit 36, and an integration circuit 38. The delay circuit 32 delays the signal waveform of the input i-order B spline function by a predetermined time T. The delay time T is set to a value equal to the input time interval of each piece of discrete data shown in FIG. 3. The inverting amplifier 34 polarity-inverts an input signal, and inverts the polarity of the signal waveform of the i-order B spline function output from the delay circuit 32. The adding circuit 36 adds in an analog algorithm an input signal waveform of the i-order B spline function to the signal waveform of the i-order B spline function whose polarity is inverted after the time delay of T by passing it through the delay circuit 32 and the inverting amplifier 34 The integration circuit 38 time-integrates a signal waveform output from the adding circuit 36.

Figure 7A:
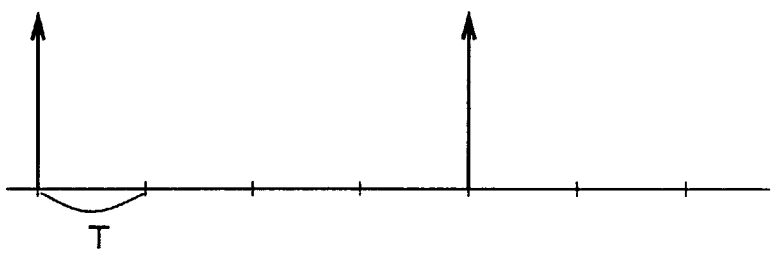
FIGS. 7A to 7C are graphs showing signal waveforms of each unit of convolution operation circuit at the first stage of the B spline function generation circuit.
Figure 7B:
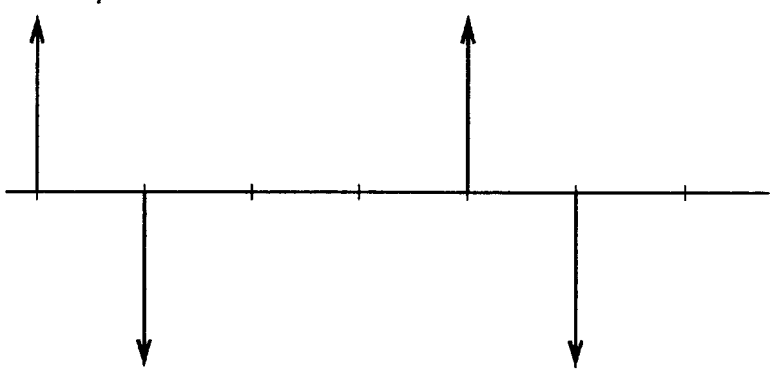
Figure 7C:
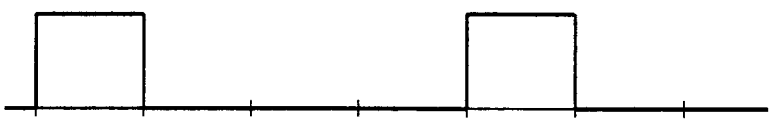

Described below will be the operations of the convolution operation circuits 30 at respective stages. FIGS. 7A to 7C show the signal waveforms input to and output from each unit of the convolution operation circuit 30-1 at the first stage. When a pulse of a predetermined period (for example, a period of 4T) shown in FIG. 7A is input to the convolution operation circuit 3-1, the input signal is added to the signal obtained by delaying by the period of T and polarity-inverting the input signal. Therefore, the adding circuit 36 outputs a signal in which pulses of different polarities as shown in FIG. 7B are alternately arranged. Accordingly, by integrating the signal by the integration circuit 38, a rectangular wave having the period of 4T and the duty ratio of 25% as shown in FIG. 7C is output.

Figure 8A:
FIGS. 8A to 8C are graphs showing signal waveforms of each unit of convolution operation circuit at the second stage of the B spline function generation circuit.
Figure 8B:
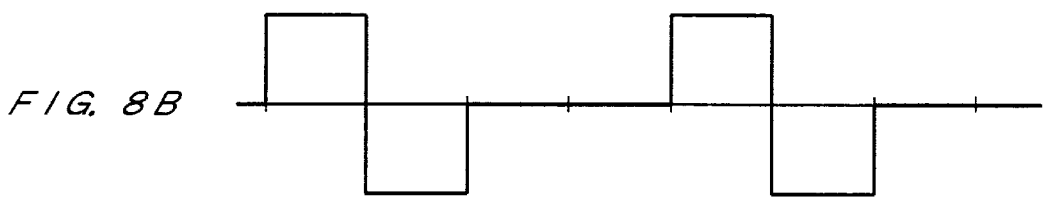
Figure 8C:
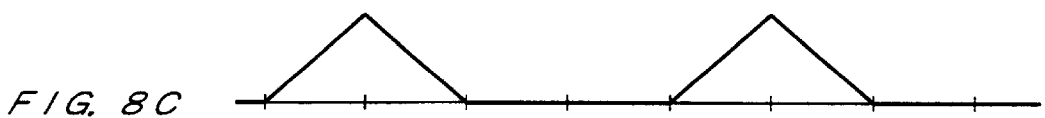

FIGS. 8A to 8C show the signal waveforms input to and output from each unit of the convolution operation circuit 30-2 at the second stage. When the rectangular wave having the period of 4T and the duty ratio of 25% as shown in FIG. 8A is input to the convolution operation circuit 30-2 the input rectangular wave is added to the signal obtained by delaying by the period of T and polarity-inverting the rectangular wave. Therefore, the adding circuit 36 outputs a signal in which rectangular waves of different polarities as shown in FIG. 8B are alternately arranged. Accordingly, by integrating the signal by the integration circuit 38, a partially triangular wave having the period of 4T as shown in FIG. 8C is output.

Figure 9A:
FIGS. 9A to 9C are graphs showing signal waveforms of each unit of convolution operation circuit at the third stage of the B spline function generation circuit.
Figure 9B:
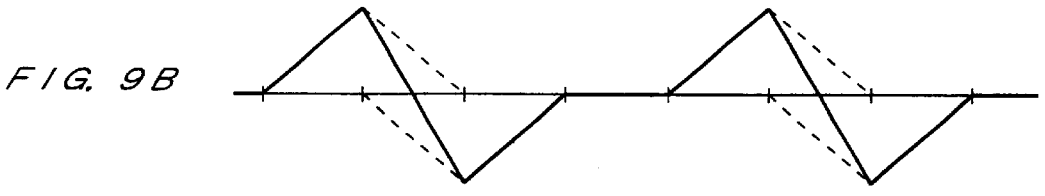
Figure 9C:
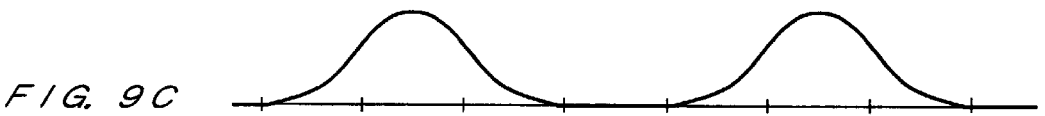

FIGS. 9A to 9C show the signal waveforms input to and output from each unit of the convolution operation circuit 30-3 at the third stage. When the triangular wave shown in FIG. 9A is input to the convolution operation circuit 30-3, the input signal is added to the signal obtained by delaying by the period of T and polarity-inverting the signal. Therefore, the adding circuit 36 outputs the signal shown in FIG. 9B. Accordingly, by integrating the output signal by the integration circuit 38, the third order B spline function signal shown in FIG. 9C is obtained.

Thus, the B spline function generation circuit 10 according to the present embodiment can continuously generate a signal waveform of a third order B spline function with a simple configuration.

In the explanation of the B spline function generation circuit 10 shown in FIG. 6, a pulse string is input to the convolution operation circuit 30-1 at the first stage. However, as a signal to be actually input externally, the rectangular wave as shown in FIG. 8A and the triangular wave as shown in FIG. 9A can be more easily generated. Therefore, the signals can be input to the convolution operation circuit 30-2 at the second stage or the convolution operation circuit 30-3 at the third stage.

FIG. 10 shows the configuration of a rectangular wave generation circuit 40 for generating a rectangular wave to be input to the convolution operation circuit 30-2 at the second stage. The rectangular wave generation circuit 40 shown in FIG. 10 comprises a 2-bit counter 42 and an AND gate 44. A clock signal having a period of T is input to the clock terminal of the 2-bit counter 42. Each of the bits Q0 and Q1 of the output terminal of the 2-bit counter 42 is connected to the respective input terminals of the AND gate 44. A rectangular wave output from the AND gate 44 is input to the reset terminal R (negative logic) of the 2-bit counter 42, output as an output of the rectangular wave generation circuit 40, and input to the convolution operation circuit 30-2 at the second stage shown in FIG. 6.

FIGS. 11A to 11D show various signal waveforms input to and output from each unit of the rectangular wave generation circuit 40 shown in FIG. 10. When the 2-bit counter 42 receives a clock signal having a period of T as shown in FIG. 11A, it performs a counting operation in synchronization with the rise of the clock signal, and outputs the rectangular waves shown in FIGS. 11B and 11C respectively from the low order bit Q0 and the high order bit Q1 of the output terminal. The AND gate 44 obtains a logic product of the signal output from each of the bits Q0 and Q1 of the output terminal of the 2-bit counter 42, and obtains a rectangular wave having a period of 4T and a duty ratio of 25% as shown in FIG. 11D as an output of the rectangular wave generation circuit 40.

When a rectangular wave output from the rectangular wave generation circuit 40 is input to the convolution operation circuit 30-2 at the second stage of the B spline function generation circuit 10, the convolution operation circuit 30-1 at the first stage is not required. Therefore, it can be deleted from the circuit configuration shown in FIG. 6.

Figure 12:
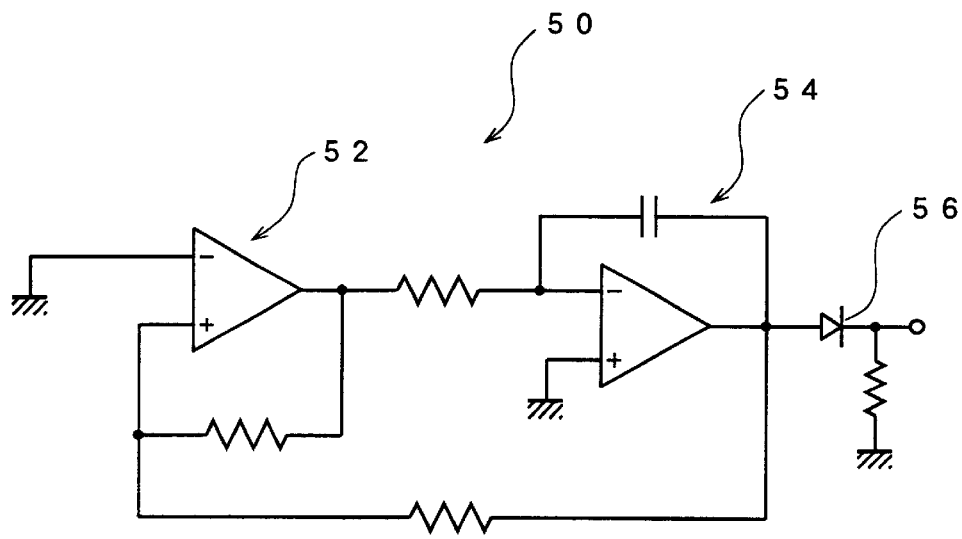
FIG. 12 is a diagram showing a configuration of a triangular wave generation circuit.
Figure 13A:
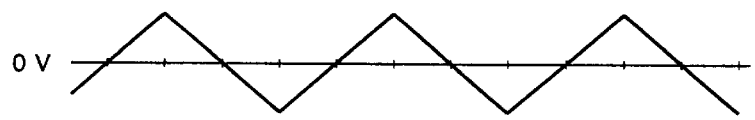
FIGS. 13A and 13B are graphs showing signal waveforms of each unit of the triangular wave generation circuit.
Figure 13B:
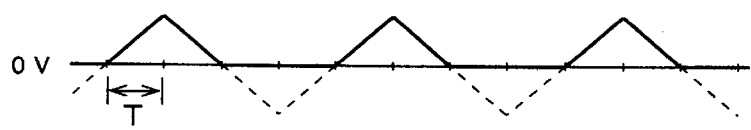
Figure 14:
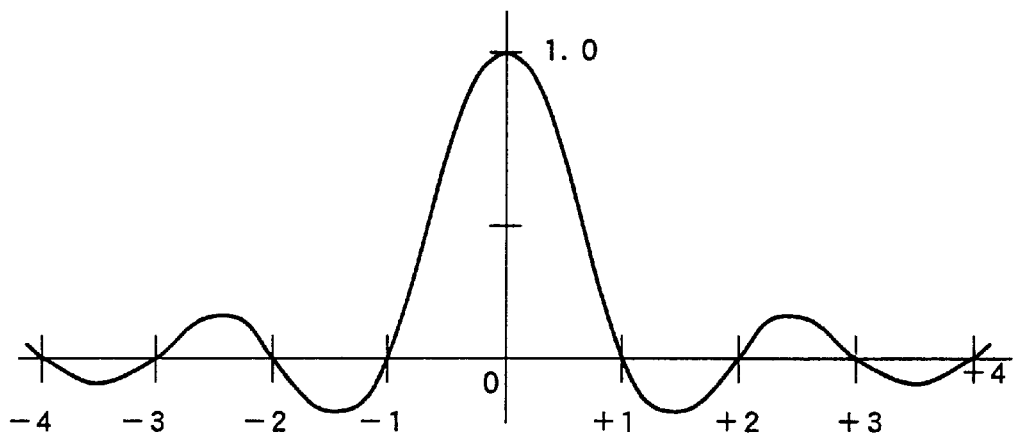
FIG. 14 is an explanatory graph of a sinc function.
Figure 15:
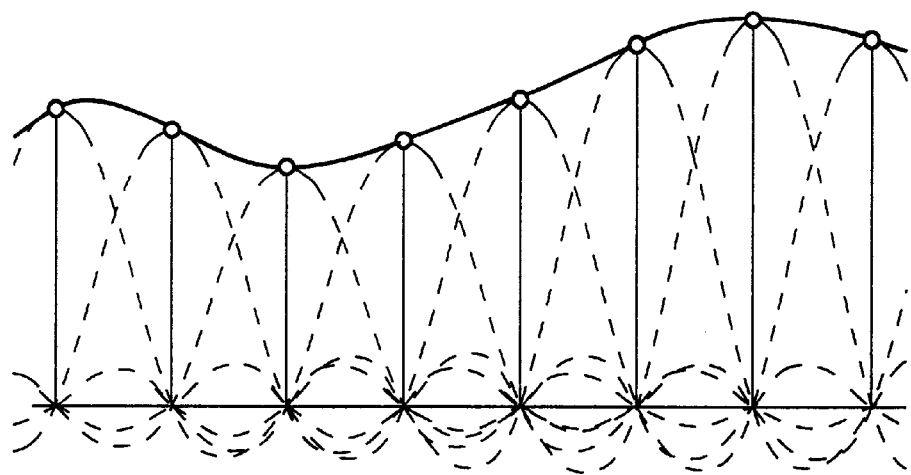
FIG. 15 is an explanatory graph of data interpolation using the sinc function.

FIG. 12 shows the configuration of a triangular wave generation circuit 50 for generating a triangular wave to be input to the convolution operation circuit 30-3 at the third stage. FIGS. 13A and 13B also show the signal waveforms to be input to and output from each unit of the triangular wave generation circuit 50 shown in FIG. 12. The triangular wave generation circuit 50 shown in FIG. 12 comprises a hysteresis comparator 52 and an integrator 54 to generate a triangular wave shown in FIG. 13A, retrieves only the positive polarity of the triangular wave using a diode 56, and obtains a partial triangular wave shown in FIG. 13B as an output of the triangular wave generation circuit 50.

Since the output triangular wave of the positive polarity equal to or lower than the voltage in the forward direction is cut off when the diode 56 is used, it is desirable that, for example, a comparator whose threshold is set to 0V and an analog switch whose ON/OFF state is set by the output of the comparator are used in combination to correctly retrieve a triangular wave equal to or higher than 0V so that the element of 0V or higher of the triangular wave signal output from the integrator 54 can be extracted. When a triangular wave out put from the triangular wave generation circuit 50 is input to the convolution operation circuit 30-3 at the third stage of the B spline function generation circuit 10 the convolution operation circuit 30-1, 30-2 at the first and second stages are not required. Therefore, they can be deleted from the circuit configuration shown in FIG. 6.

The present invention is not limited to the above mentioned embodiments, but various other embodiments can be applied in the range of the gist of the present invention. For example, in the sampling function generator 1 shown in FIG. 1, the inverting amplifier 18 is connected subsequently to the delay circuit 14, but this connection order can be inverted. Similarly, in each of the convolution operation circuits 30 contained in the B spline function generation circuit 10 shown in FIG. 6, the inverting amplifier 34 is connected subsequently to the delay circuit 32, but the connection order can also be inverted.

In addition, when the operations of each of the convolution operation circuits 30 contained in the B spline function generation circuit 10 shown in FIG. 6 are described above, the periodic pulses, rectangular waves, and triangular waves as shown in FIGS. 7, 8, and 9 are input to each of the convolution operation circuits 30-1, 30-2, and 30-3, but it is not always necessary to input these periodic signals to generate a single signal waveform of a sampling function. That is, a single pulse, rectangular wave, or triangular wave can be input.

Industrial Applicability

As described above, according to the present invention, a B spline function generation unit generates a basic waveform corresponding to a B spline function, and a generation unit generates a signal waveform by adding before or after the basic waveform on time axis an ancillary waveform obtained by attenuating and polarity-inverting the basic waveform. With the above operation, an output value corresponding to a predetermined sampling function can be continuously obtained.

What is claimed is:

1. A sampling function generator which continuously generates a signal waveform corresponding to a sampling function, comprising:

a B spline function generation unit continuously generating a signal waveform corresponding to a B spline function;

a generation unit generating a signal waveform by adding an ancillary waveform obtained by attenuating and polarity-inverting a basic waveform before and after the basic waveform on a time axis when a signal waveform output from said B spline function generation unit is defined as the basic waveform.

2. The sampling function generator according to claim 1, wherein:

said B spline function is a third order B spline function; and said sampling function is a finite function of local support that can be differentiated only once over the whole region.

3. The sampling function generator according to claim 2, wherein, with letting said third order B spline function be F(t), said sampling function is defined as follows:

$$H(t)=-F(t+1/2)/4;+F(t)-F(t-1/2)/4.$$

4. The sampling function generator according to claim 3, wherein said third order B spline function F(t) is expressed as follows:

$(4t^2+12t+9)/4; \ -3/2 \leq t < -1/2$ $-2t^2+3/2; \ -1/2 \leq t < 1/2$ $(4t^2-12t+9)/4; \ 1/2 \leq t < 3/2$ 5. The sampling function generator according to claim 1, wherein said generation unit comprises:
   a first inverse amplifying unit attenuating and polarity-inverting said basic waveform output from said B spline function generation unit to output a first signal waveform;
   a first delay unit outputting a second signal waveform by delaying said basic waveform by a predetermined time;
   a second inverse amplifying unit and a second delay unit attenuating, polarity-inverting, and delaying by a predetermined time said basic waveform to output a third signal waveform; and
   a first addition unit adding up the first, second and third signal waveforms in an analog algorithm to generate a signal waveform.

6. The sampling function generator according to claim 5, wherein:
   when a generation time of the B spline function by said B spline function generation unit is 3T, a delay time of said first delay unit is set to T/2, and a delay time of said second delay unit is set to T; and
   an amount of attenuation by said first and second inverse amplifying unit is set to 1/4.

7. The sampling function generator according to claim 1, wherein said B spline function generation unit comprises a convolution operation unit for performing a convolution operation on i-order B spline functions, and continuously outputs a signal waveform of a third order B spline function by inputting to said convolution operation unit a signal waveform of a second order B spline function.

8. The sampling function generator according to claim 7, wherein said convolution operation unit comprises:
   a third delay unit and a third inverse amplifying unit delaying and polarity-inverting an input signal waveform by a predetermined time;
   a second addition unit generating a signal waveform by adding a delayed and polarity-inverted signal waveform output from said third delay unit or said third inverse amplifying unit to said input signal waveform in an analog algorithm; and
   an integration unit time-integrating a signal waveform output from said second addition unit.

9. The sampling function generator according to claim 1, wherein said B spline function generation unit comprises two cascade connected convolution operation units for performing a convolution operation on i-order B spline functions, and continuously outputs a signal waveform of a third order B spline function from the subsequent stage of said convolution operation unit by inputting to first stage of said convolution operation unit a signal waveform of a first order B spline function.

10. The sampling function generator according to claim 9, wherein said convolution operation unit comprises:
    a third delay unit and a third inverse amplifying unit delaying and polarity-inverting an input signal waveform by a predetermined time;
    a second addition unit generating a signal waveform by adding a delayed and polarity-inverted signal waveform output from said third delay unit or said third inverse amplifying unit to said input signal waveform in an analog algorithm; and
    an integration unit time-integrating a signal waveform output from said second addition unit.

11. The sampling function generator according to claim 1, wherein said B spline function generation unit comprises three cascade connected convolution operation units for performing a convolution operation on i-order B spline functions, and continuously outputs a signal waveform of a third order B spline function from the final stage of said convolution operation unit by inputting to first stage of said convolution operation unit pulse strings.

12. The sampling function generator according to claim 11, wherein said convolution operation unit comprises:
    a third delay unit and a third inverse amplifying unit delaying and polarity-inverting an input signal wave-form by a predetermined time;
    a second addition unit generating a signal waveform by adding a delayed and polarity-inverted signal waveform output from said third delay unit or said third inverse amplifying unit to said input signal waveform in an analog algorithm; and
    an integration unit time-integrating a signal waveform output from said second addition unit.

\* \* \* \* \*